(12) United States Patent
Leonard

(10) Patent No.: US 9,092,282 B1
(45) Date of Patent: Jul. 28, 2015

(54) CHANNEL OPTIMIZATION IN A MESSAGING-MIDDLEWARE ENVIRONMENT

(75) Inventor: Mark D. Leonard, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 524 days.

(21) Appl. No.: 13/585,244

(22) Filed: Aug. 14, 2012

(51) Int. Cl.
*G06F 13/00* (2006.01)
*G06F 9/54* (2006.01)

(52) U.S. Cl.
CPC ........................ *G06F 9/546* (2013.01)

(58) Field of Classification Search
CPC ........................................ G06F 9/546
USPC ................................. 719/313, 314
See application file for complete search history.

(56) References Cited

U.S. PATENT DOCUMENTS

| | | | |
|---|---|---|---|
| 5,937,205 A | 8/1999 | Mattson et al. | |
| 6,035,424 A | 3/2000 | Freerksen et al. | |
| 6,182,109 B1 | 1/2001 | Sharma et al. | |
| 6,434,605 B1 * | 8/2002 | Faulkner et al. | 709/213 |
| 6,496,516 B1 | 12/2002 | Dabecki et al. | |
| 6,760,580 B2 | 7/2004 | Robinson et al. | |
| 7,127,517 B2 | 10/2006 | Heisig et al. | |
| 7,350,212 B2 * | 3/2008 | Lambert et al. | 719/315 |
| 7,725,577 B2 | 5/2010 | Nochta et al. | |
| 7,873,991 B1 | 1/2011 | Attwood et al. | |
| 8,156,374 B1 | 4/2012 | Ford et al. | |
| 2001/0055313 A1 | 12/2001 | Yin et al. | |
| 2002/0064126 A1 * | 5/2002 | Bhattal et al. | 370/217 |
| 2002/0170954 A1 | 11/2002 | Zingher et al. | |
| 2003/0050956 A1 | 3/2003 | Janssen et al. | |
| 2003/0061220 A1 | 3/2003 | Ibrahim et al. | |
| 2003/0110249 A1 | 6/2003 | Buus et al. | |
| 2003/0177412 A1 | 9/2003 | Todd | |
| 2003/0182464 A1 * | 9/2003 | Hamilton et al. | 709/314 |
| 2004/0176864 A1 | 9/2004 | Cocco et al. | |
| 2004/0215998 A1 | 10/2004 | Buxton et al. | |
| 2005/0038824 A1 | 2/2005 | Kenntner et al. | |
| 2005/0089053 A1 | 4/2005 | Zhu | |
| 2005/0125464 A1 | 6/2005 | Kline | |
| 2005/0183093 A1 | 8/2005 | Pope et al. | |
| 2005/0228900 A1 | 10/2005 | Stuart et al. | |
| 2006/0129684 A1 | 6/2006 | Datta | |
| 2006/0146711 A1 | 7/2006 | Anbarani | |
| 2006/0177069 A1 * | 8/2006 | Critchley et al. | 380/283 |
| 2006/0212367 A1 | 9/2006 | Gross | |
| 2007/0112921 A1 | 5/2007 | Lunt et al. | |

(Continued)

OTHER PUBLICATIONS

Davis, Saida and Broadhurst, Peter: Redbooks, WebSphere MQ V6 Fundamentals, IBM WebSphere.software, ibm.com/redbooks, 446 pages, First Edition (Nov. 2005).

(Continued)

*Primary Examiner* — Andy Ho

(57) ABSTRACT

A method, system, and medium are provided for monitoring channels running on a queue manager. Both the total number of channel instances and instances of each named channel running on a queue manager may be monitored over time. The number of channels running over time may be compared to the total number of channels allocated to the queue manager. The allocation may be adjusted when the comparison indicates too few or too many channels are allocated to the queue manager. Individual channel instances may also be evaluated to optimize allocation at a more granular level.

20 Claims, 9 Drawing Sheets

(56) References Cited

U.S. PATENT DOCUMENTS

| | | | |
|---|---|---|---|
| 2007/0168874 | A1 | 7/2007 | Kloeffer et al. |
| 2007/0288157 | A1 | 12/2007 | Peterman |
| 2007/0294708 | A1 | 12/2007 | Kline |
| 2007/0294709 | A1 | 12/2007 | Bae et al. |
| 2008/0163249 | A1 | 7/2008 | Garza et al. |
| 2008/0267203 | A1 | 10/2008 | Curcio et al. |
| 2008/0301709 | A1 | 12/2008 | Ban |
| 2009/0180380 | A1 | 7/2009 | Prabhakar et al. |
| 2010/0162265 | A1 | 6/2010 | Heddes |
| 2010/0223491 | A1 | 9/2010 | Ladd et al. |
| 2011/0041132 | A1 | 2/2011 | Andrade et al. |
| 2011/0265098 | A1 | 10/2011 | Dozsa et al. |
| 2011/0289165 | A1* | 11/2011 | Hobson et al. .......... 709/206 |
| 2012/0096113 | A1 | 4/2012 | Ladd et al. |
| 2012/0260261 | A1 | 10/2012 | Tillier |
| 2012/0291034 | A1 | 11/2012 | Kamath et al. |

OTHER PUBLICATIONS

Mann, Ben: Worldwide Product Manager, Providing a backbone for conectivity with SOA Messaging, IBM WebSphere.software, Service oriented architecture solutions, White paper, Updaetd: Jun. 2009, 32 pages, ibm.com/webspheremq.

IBM, Websphere MQ—Intercommunication Version 6.0 2005, IBM, pp. 1-573.

Triantos, Nick, Queue Depth, Apr. 30, 2006, storagefoo.blogspot.com [online, accessed on Dec. 17, 2010], URL; http://storagefoo.blogspot.com/2006/04/queue-depths.html.

Duchovni, Victor, "Postfix Bottleneck Analysis", Dec. 25, 2006, 9 pages.

Venema, Wietse, "QMGR(8)", Oct. 17, 2007, 6 pages.

Duchovni, Victor, "QSHAPE(1)", Oct. 27, 2007, 2 pages.

"Open VMS System Manager's Manual", Mar. 2001, Compaq.

Notice of Allowance, dated Sep. 20, 2013 re U.S. Appl. No. 11/854,342, 24 pages.

First Action Interview mailed Nov. 13, 2012 U.S. Appl. No. 12/685,383; 6 pages.

Saida Davis and Peter Broadhurst, Redbooks, WebSphere MQ V6 Fundamentals, IBM WebSphere.software, ibm.com/redbooks, 446 pages, First Edition (Nov. 2005). This IBM Redbook edition is an update to the Redpaper MQSeries Primer, REDP-0021. This edition applies to Version 6, Release O, Modification O, of IBM WebSphere MQ (product No. 5724-H72).

Ben Mann, Worldwide Product Manager, Providing a backbone for connectivity with SOA Messaging, IBM WebSphere.software, Service oriented Architecture solutions, White paper, Updated: Jun. 2009, 32 pages, ibm.com/webspheremq, Copyright IBM Corporation 2009, Produced in the United States of America 03-07.A16.

Preinterview First Office Action mailed on Jun. 8, 2012 U.S. Appl. No. 12/685,383; 12 pages.

Notice of Allowance and Fees Due mailed Feb. 14, 2013 in U.S. Appl. No. 12/685,383; 32 pages.

Final Office Action mailed Jan. 10, 2014 in U.S. Appl. No. 12/346,119, 31 pages.

Notice of Allowance dated Feb. 18, 2014 re U.S. Appl. No. 13/659,465, 47 pages.

Ogasawara, Dynamic Thread Count Adaptation for Multiple Services in SMP Environments, IBM Tokyo Research Lab, Kanagawa, Japan, 2008 IEEE International Conference on Web Services, 8 pages.

Notice of Allowance dated Mar. 21, 2014 in U.S. Appl. No. 12/346,119, 9 pages.

* cited by examiner

CHANNEL OPTIMIZATION IN A MESSAGING-MIDDLEWARE ENVIRONMENT

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of optimizing an allocation of channels to a queue manager are provided. The method comprises building a channel-allocation history for a queue manager in a messaging-middleware environment by: retrieving, at a point in time, channel data for the queue manager, determining a usage number that indicates how many different channels are running at the point in time, determining a maximum number of channels allocated to the queue manager at the point in time, and generating an optimization data point for the point in time that comprises the usage number divided by the maximum number of channels. The method also comprises, using the channel-allocation history that comprises a plurality optimization data points for a plurality of points in time, generating a comparison of channel usage and channel allocation for the queue manager over a time period. The method also comprises outputting for display, the comparison.

In another illustrative embodiment, one or more computer-readable media having computer-executable instructions embodied thereon for performing a method of optimizing an allocation of channel instances in a queue manager. The method comprises building an instance-specific channel-allocation history for a specific named channel within the queue manager by: at a point in time, retrieving channel data for the queue manager, determining a running-channel number indicating how many instances of the specific named channel are running, and generating an instance-optimization data point for the point in time that comprises at least the running-channel number at the point in time. The method also comprises using the instance specific channel-allocation history that comprises a plurality instance-optimization data points for a plurality of points of time, generating a specific instance comparison that indicates the running-channel number over a period of time. The method also comprises outputting for display, the specific instance comparison.

In a third illustrative embodiment, a method of optimizing an allocation of channels to a queue manager is provided. The method comprises building a channel-allocation history for a queue manager, which is one of a plurality of queue managers in a messaging-middleware environment, by: retrieving, at a point in time, channel data for the queue manager, determining a usage number that indicates how many different channels are running on the queue manager at the point in time, and generating an optimization data point for the point in time that is based on the usage number. The method also comprises using the channel-allocation history for the queue manager and similar histories for other queue managers in the plurality of queue managers, generating a comparison of channel usage and channel allocation for the queue managers over a time period. The method also comprises outputting for display, the comparison.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention will be better understood from the detailed description provided below and from the accompanying drawings of various embodiments of the invention. Embodiments of the present invention relate generally to optimally allocating channel resources appropriately to a queue manager and to particular named channels on a queue manager. The queue manager may be part of a messaging middleware application, which is described in more detail below. Both the total number of channel instances and instances of each named channel running on a queue manager may be monitored and optimized. The current channel allocation may be visually depicted in several different ways that highlight non-optimized allocations.

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently. The computer-readable media is non-transitory.

Figure 1:
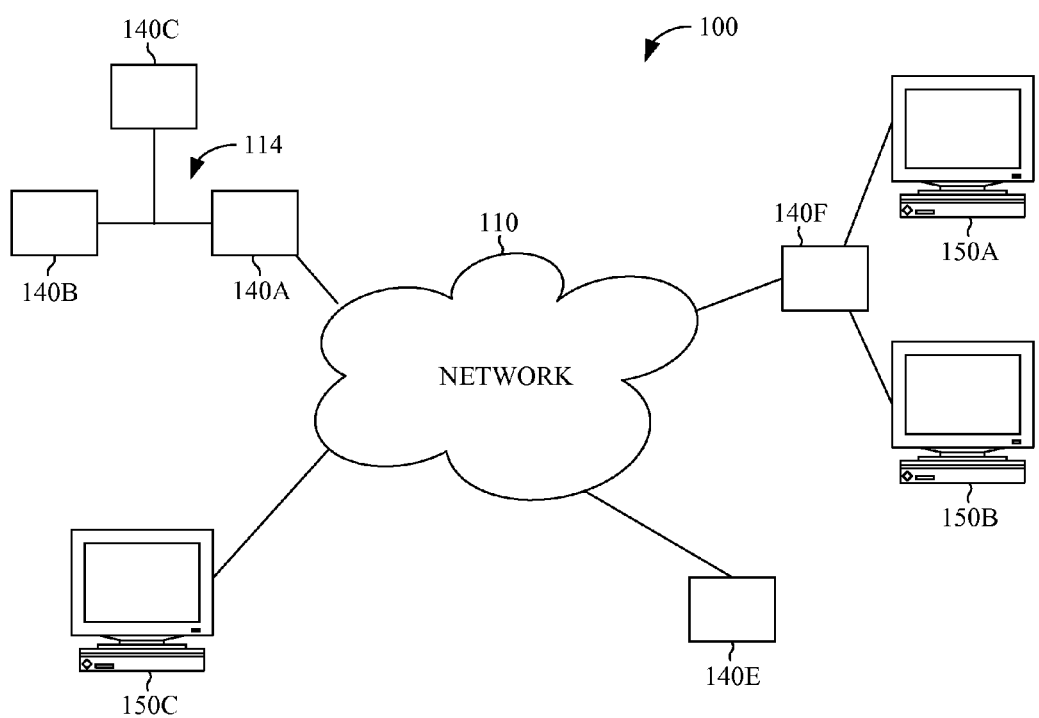
FIG. 1 is a drawing of an illustrative environment in which an embodiment of the present invention may operate.

Embodiments of the present invention can be practiced in a distributed computing environment, where multiple computing devices are communicatively interconnected through a network (e.g., local-area network (LAN) or a wide-area network (WAN) including the Internet). Referring initially to FIG. 1, a block diagram depicting an exemplary operating environment 100 is shown. The operating environment 100 comprises client computing devices 150A, 150B, and 150C, servers 140A, 140B, 140C, which communicate with each other via LAN 114, servers 140E and 140F all of which communicate with each other via network 110. Operating environment 100 is merely an example of one suitable networking environment and is not intended to suggest any limitation as to the scope of use or functionality of embodiments of the present invention. Neither should operating environment 100 be interpreted as having any dependency or requirement related to any single component or combination of components illustrated therein.

The client computing devices 150A, 150B, and 150C are configured for storing and/or processing computer-executable instructions and computer-readable data. By way of example only and not limitation, the client computing devices 150A, 150B, and 150C may be a personal computer, desktop computer, laptop computer, handheld device, cellular phone, consumer electronic, digital phone, smartphone, PDA, or the like. It should be noted that embodiments are not limited to implementation on such computing devices.

Network 110 might include a computer network or combination thereof. Examples of networks configurable to operate as network 110 include, without limitation, a wireless network, landline, cable line, digital subscriber line (DSL), fiber-optic line, local area network (LAN), wide area network (WAN), metropolitan area network (MAN), or the like. Network 110 is not limited, however, to connections coupling separate computer units. Rather, network 110 may also comprise subsystems that transfer data between servers or computing devices. For example, network 110 may also include a point-to-point connection, the Internet, an Ethernet, an electrical bus, a neural network, or other internal system. Furthermore, network 110 may include a WiMAX-enabled infrastructure (i.e., components that conform to IEEE 802.16 standards).

The servers 140A-F may be a type of application server, database server, or file server configurable to perform the methods described herein. In addition, each of the servers 140A-F may be a dedicated or shared server. Components of the servers 140A-F might include, without limitation, a processing unit, internal system memory, and a suitable system bus for coupling various system components, including one or more databases for storing information (e.g., files and metadata associated therewith). Each server may also include, or be given access to, a variety of computer-readable media.

Local Area Network 114 allows servers 140A-C to communicate with each other apart from network 110. The servers 140A-C are connected to the LAN through a network interface or adapter. Servers 140B and 140C may connect to network 110 through server 140A. This is just one of many aspects of operating environment 100 that may be present, but is not required, to implement embodiments of the present invention.

It will be understood by those of ordinary skill in the art that operating environment 100 is merely exemplary. While the servers 140A-F are illustrated as single boxes, one skilled in the art will appreciate that they are scalable. For example, the server 140C may, in actuality, include multiple boxes in communication. The single unit depictions are meant for clarity, not to limit the scope of embodiments in any form.

Figure 2:
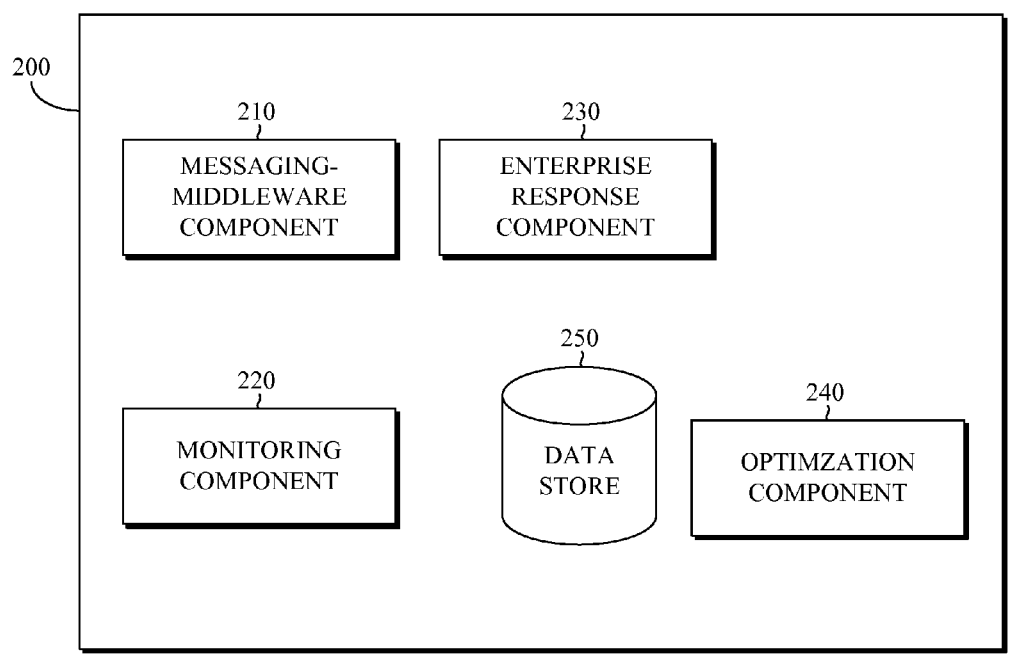
FIG. 2 is a drawing of an operating environment in which an embodiment of the present invention may be practiced.

Turning now to FIG. 2, a block diagram depicts an exemplary computing system architecture 200 suitable for automatically optimizing channel allocation for a queue manager. It will be understood and appreciated by those of ordinary skill in the art that the exemplary computing system architecture 200 shown in FIG. 2 is merely an example and is not intended to suggest any limitation as to the scope of the use or functionality of embodiments of the present invention. Neither should the exemplary computing system architecture 200 be interpreted as having any dependency or requirement related to any single component or combination of components illustrated therein.

Exemplary computing system architecture 200 includes a messaging-middleware component 210, a monitoring component 220, an enterprise response component 230, an optimization component 240, and data store 250. Exemplary computing-system architecture 200 may reside in a single computing device. In the alternative, exemplary computing system architecture 200 may reside in a distributed computing environment that includes multiple computing devices coupled with one another via one or more networks, for example, operating environment 100 described with reference to FIG. 1.

Messaging-middleware component 210 is configured to transfer information between two or more applications in the form of messages. Examples of commercially available messaging middleware applications (a.k.a. message-oriented middleware) include IBM's WebSphere® MQ (formerly MQ Series®), Fiorano's MQ, Oracle Advanced Queuing (AQ), and Microsoft's MSMQ. The messaging-middleware component 210 can be any application that uses queues to transfer messages from one application to another. For example, information from a front-end application is formed into one or more messages. These messages from the front-end application are placed in a sending queue within the messaging-middleware component 210 and transferred into a receiving queue within the messaging-middleware component 210. A back-end program retrieves the message from the receiving queue. The message is transmitted through channels within the messaging-middleware component 210. In this example, the front-end program and the back-end program could be located on any computing device communicatively coupled to the one or more computers on which the messaging-middleware component 210 resides. A messaging-middleware client may reside on both of the computing devices on which the front-end and back-end programs reside to allow interaction with the messaging-middleware component 210.

The messaging-middleware component 210 may manage thousands of queues. In one embodiment, the messaging-middleware component 210 operates in parallel with secondary messaging-middleware components (not shown) containing additional instances of the queues managed by the messaging-middleware component 210. As described previously, a queue transfers messages between two programs. Parallel queue instances transfer the same type of message between the same two programs, but are managed by separate messaging-middleware components.

The channels, queues, and queue manager settings within the messaging-middleware component 210 are described by a series of attributes. Each attribute has an associated value or setting. For example, one attribute could be a channel name and the associated setting could be "SprintBillinginfo1." Some attributes are preset, while other attributes measure current conditions within the channel and change over time. For example, the queue name attribute is preset, but the number of channels running on a queue manager changes based on the number of channels currently running.

Monitoring component 220 is configured to monitor messaging-middleware objects (e.g., channels and queues). Examples of commercially available monitoring components include HP Openview®, Q Pasa!® by MQSoftware, Candle's PathWAI, and BMC Patrol. The monitoring component 220 may retrieve, store, and evaluate channel information periodically to ascertain whether an upset condition is present. For example, the number of channels running on a queue manager could be retrieved. Having retrieved one or more attribute values, the one or more attribute values may be evaluated against threshold values within the monitoring component 220. The monitoring component 220 may generate an alarm or incident message if attribute values are outside of normal operating conditions. The monitoring component 220 may perform one or more calculations with the one or more attribute values to arrive at a threshold. For example the monitoring component 220 may calculate the threshold channel instances for a queue manager by multiplying a maximum number of channels a queue manager is configured to run at one time by a percentage to arrive at the threshold. The current number of channels operating may then be compared against a threshold value and an incident message generated if the current number of channels is within a cautionary range. In one embodiment, the percentage is 90%.

The monitoring component 220 is also configured to generate and transmit notifications describing potential problems within a channel. A problem may be indicated when one or more attribute values or calculated values fall outside of a normal operating range. In one embodiment, the information about the potential problem is transmitted to enterprise response component 230. In another embodiment, the monitoring component 220 directly notifies a designated responder about the potential problem.

Enterprise response component 230 is configured to coordinate a response to a problem detected in a channel. The enterprise response component 230 may receive information regarding a malfunction from a monitoring component 220 or another source. Upon receiving notification of a malfunction, the enterprise response component 230 may page a designated responder to investigate the upset condition. A designated responder may be an individual person or group of people given responsibility to fix upset conditions within certain channels. In another embodiment, the designated responder may be a computer application that takes corrective actions.

Optimization component 240 analyzes historical channel allocation for a queue manager and identifies non-optimized channel allocations. Non-optimized channel allocation can take several forms. Too many or too few total channels may be allocated to a queue manager. If too many channels are allocated to a queue manager, then valuable resources within the messaging-middleware environment are wasted. This waste may go unnoticed because these queue managers are unlikely to have operational issues caused by allocating more channels than are needed to the queue manager. The opposite allocation problem is allocating too few channels to a queue manager. When too few channels are allocated, then messages may be lost, or the operations of the queue manager slowed when channel capacity is reached. In addition, responders may spend significant amounts of time responding to alarms generated by the monitoring component 220.

Similar channel allocation problems may exist for individual named channels. A specific number of channel instances may be allocated to a particular named channel. Again, either too many or too few channel instances may be allocated to the particular named channel. Using the methods explained in FIGS. 5-7, the optimization component 240 analyzes channel usage vs. channel allocation and visually display channel allocation in a way that illustrates the present optimization. Before explaining those methods, the allocation of channels and what is meant by particular instances of a named channel are illustrated in more detail with reference to FIGS. 3 and 4.

Figure 3:
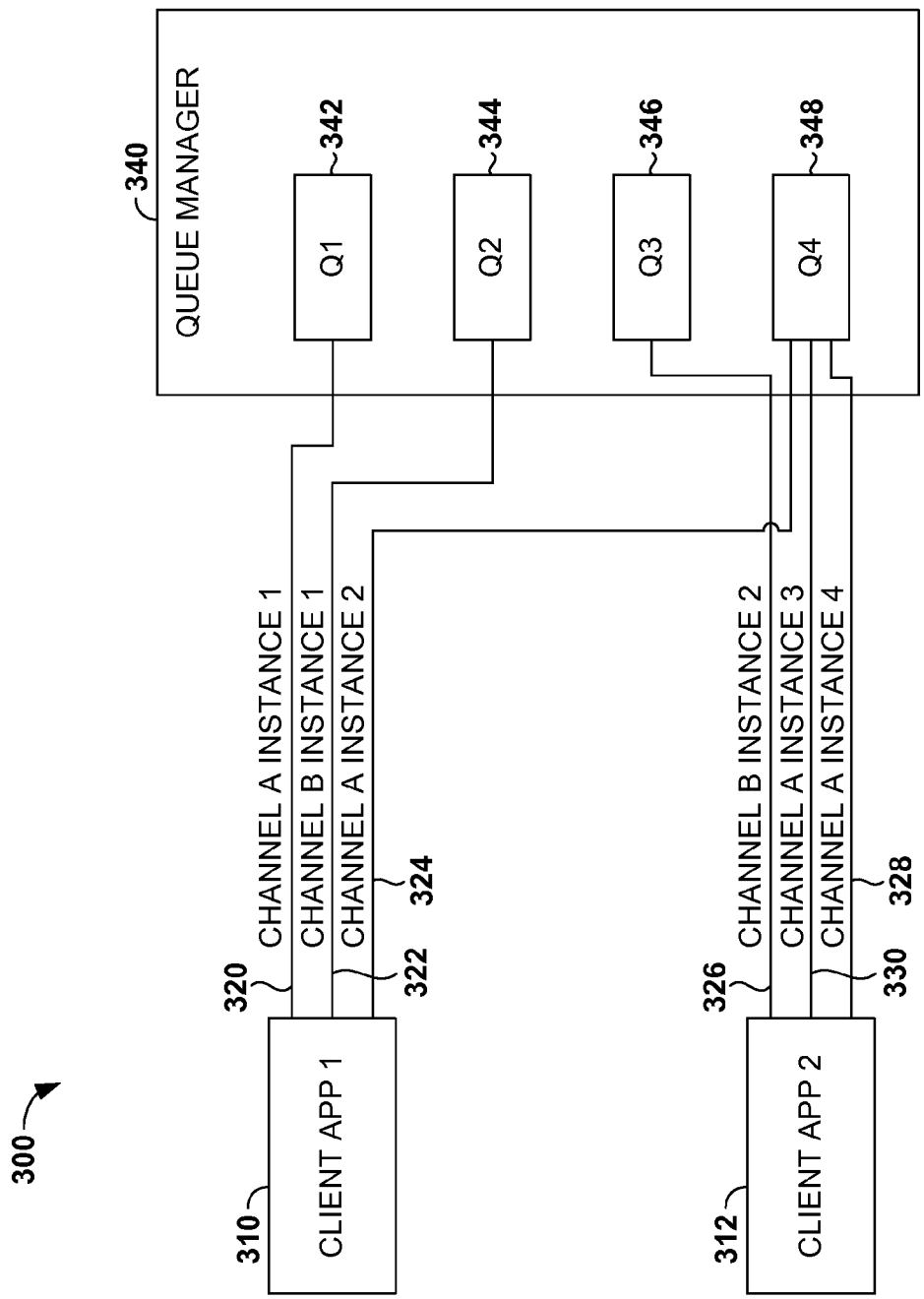
FIG. 3 is a drawing illustrating channels and channel instances in an operating environment in which an embodiment of the present invention may be practiced.

Turning now to FIG. 3, a diagram illustrating exemplary channel instances in a messaging-middleware environment 300 is shown, in accordance with an embodiment of the present invention. As mentioned previously, embodiments of the present invention allow a user to manage individual instances of channels. The channels are logical channels. They are used by queue managers and other entities within the messaging-middleware environment 300 to communicate messages. An individual channel can have multiple instances. Multiple instances of the same channel have a common channel definition. Individual channel instances may communicate messages between the same or different endpoints. The channels may be unidirectional or bidirectional. Unidirectional channels may be set up in pairs to facilitate two-way communication between queue managers. The channels may be set up automatically by a message channel agent or other component when a queue manager has one or more messages to transmit to a second queue manager. Once established, a channel may be active for a designated period of time before it is automatically deactivated.

Messaging-middleware environment 300 includes client application 1 310, client application 2 312, and queue manager 340. Messages are communicated between the client applications and the queue manager 340 through channel instances. The individual queue manager 340 includes queue 1 342, queue 2 344, queue 3 346, and queue 4 348. In an actual embodiment, an individual queue manager may manage hundreds or thousands of individual queues. Four queues are shown for the sake of simplicity.

Messaging-middleware environment 300 includes four instances of channel A. As described previously, each instance of channel A shares a common definition. The channel definition defines attributes of each channel instance that govern how messages are communicated in the channel. A developer, or other person responsible for the messaging-middleware environment 300, may use a library of channel definitions. Different channel definitions are used to initiate channel instances suitable for communicating certain types of messages under certain conditions. While individual channel instances have many characteristics in common, each channel instance may be differentiated by its process ID and a thread ID.

Figure 4:
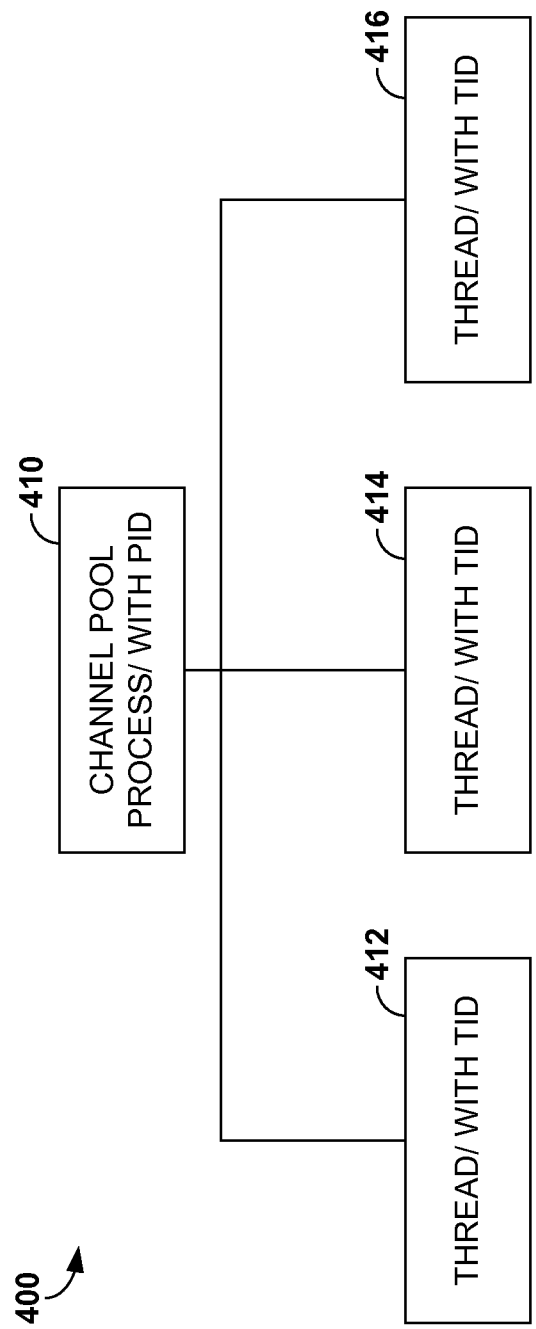
FIG. 4 is a drawing illustrating thread processing in an operating environment in which an embodiment of the present invention may be practiced.

Turning briefly to FIG. 4, the relationship between a process ID and thread ID is shown. Initially, a group of channels may be pooled together by a queue manager and assigned the same process ID. A channel pool 410 may have several individual threads. The threads have a one-to-one relationship with channel instances. Each channel instance has its own thread. In FIG. 4, the channel pool 410 includes thread 412, thread 414, and thread 416. Each thread has its own thread ID. An individual channel instance can be uniquely identified by combining the channel process ID and the thread ID.

Returning now to FIG. 3, messaging-middleware 300 includes four instances of channel A and two instances of channel B. For the sake of illustration, all six channel instances shown may have the same process ID. Alternatively, each channel instance shown may have a different process ID depending on how the channel instances were pooled together. In one embodiment, channel instances are pooled sequentially in chronological order as they are initiated.

Channel A instance 1 320 is used to communicate messages between client app 1 310 and queue 1 342. Channel B instance 1 322 communicates messages between client app 1 310 and queue 2 344. Channel A instance 2 324 communicates messages between client app 1 310 and queue manager 4 348. This illustrates that instances of the same channel can communicate messages between different endpoints. For example, instance 320 and instance 324, both instances of channel A, communicate messages between different endpoints.

Channel B instance 2 326 communicates messages between client app 2 312 and queue 3 346. Channel A instance 3 330 communicates messages between client app 2 312 and queue 4 348. Channel A instance 4 328 communicates messages between client app 2 312 and queue 4 348. This illustrates that different instances of a channel can communicate between the same endpoints, as shown by instances 328 and 330. Though not shown, different channels can also communicate messages between the same two endpoints. Embodiments of the present invention are not limited by the example channel instances shown in FIG. 3.

Optimization of Channel Allocation

Embodiments of the invention monitor channel usage over time to determine when too many or too few channels are allocated to a queue manager. The allocation of too many channels to a queue manager wastes resources that could be better used elsewhere. The allocation of too few channels may cause frequent alarms, as described above. Both situations are difficult to detect without evaluating historical usage patterns. Embodiments of the present invention monitor and record channel allocation data over time to build an allocation history. The history is used to generate comparisons that show whether channels allocation is optimized. The history may record both channel usage and allocation in queue managers. Analyzing specific channel instances within a queue manager may help determine which channel allocations should be adjusted when optimizing.

Figure 5:
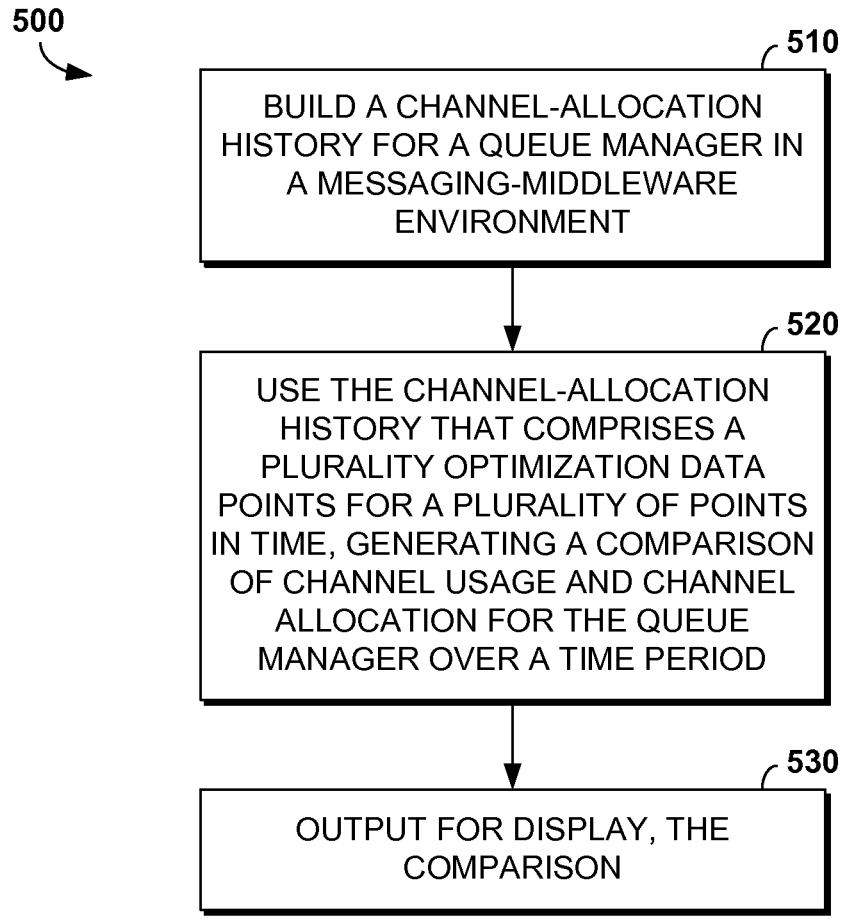
FIG. 5 is a flow diagram in which a method of optimizing an allocation of channels to a queue manager is described according to an embodiment of the present invention.

Turning now to FIG. 5, a method 500 of optimizing the allocation of channels to a queue manager is shown, in accordance with an embodiment of the present invention. As described previously, the queue managers may be part of a messaging-middleware application. A messaging-middleware application facilitates the communication of information between two or more applications. The information is communicated between queue managers in the form of messages that are transmitted over channels. The channels may be unidirectional or bidirectional. Unidirectional channels may be set up in pairs to facilitate two-way communication between queue managers. The channels may be set up automatically by a message channel agent or other component when a queue manager has one or more messages to transmit to a second queue manager. Once established, a channel may be active for a designated period of time before it is automatically deactivated.

At step 510, a channel-allocation history is built for a queue manager in the messaging-middleware environment. Building the channel-allocation history comprises retrieving, at a point in time, channel data for the queue manager. The channel data describes, at least, how many active channels the queue manager has at a point in time. In one embodiment, the channel data is retrieved using a utility function that dumps information describing all instances of channels presently operating on a queue manager. In another embodiment, a particular attribute of the queue manager describes how many channels are currently running. In the embodiment where the information or data lists all channels currently running on the queue manager, the individual channel names may be parsed from the channel data and counted to determine the total number of channels running on the queue manager. Multiple instances of the same channel may exist. Each instance may be counted individually to arrive at the total channel count.

A usage number that indicates how many different channels are running at the point in time is determined from the channel data. The usage number is recorded as part of the channel-allocation history. A maximum number of channels allocated to the queue manager at the point of time is also determined and recorded. The number of channels that the queue manager is configured to run may be retrieved from a main configuration file for the queue manager. For example, a qm.ini file may contain an attribute called "Max Channel" that indicates the maximum number of channels the queue manager is configured to run. Finally, an optimization data point that is generated for the point in time and recorded in the channel-allocation history. The optimization data point may comprise the usage number divided by the maximum number of channels allocated at the point in time. The optimization data point may be expressed as a percentage of the maximum allocation.

At step 520, the channel-allocation history, which comprises a plurality of optimization data points at different points in time, is used to generate a comparison of channel usage and channel allocation for the queue manager over a period of time. The period of time comprises multiple points in time that are recorded within the channel-allocation history. In one embodiment, the channel-allocation history includes optimization data points generated at an interval of every one second, every one minute, every one hour, or some other interval set by a user. In one embodiment, the interval is customizable through an optimization interface.

Figure 8:
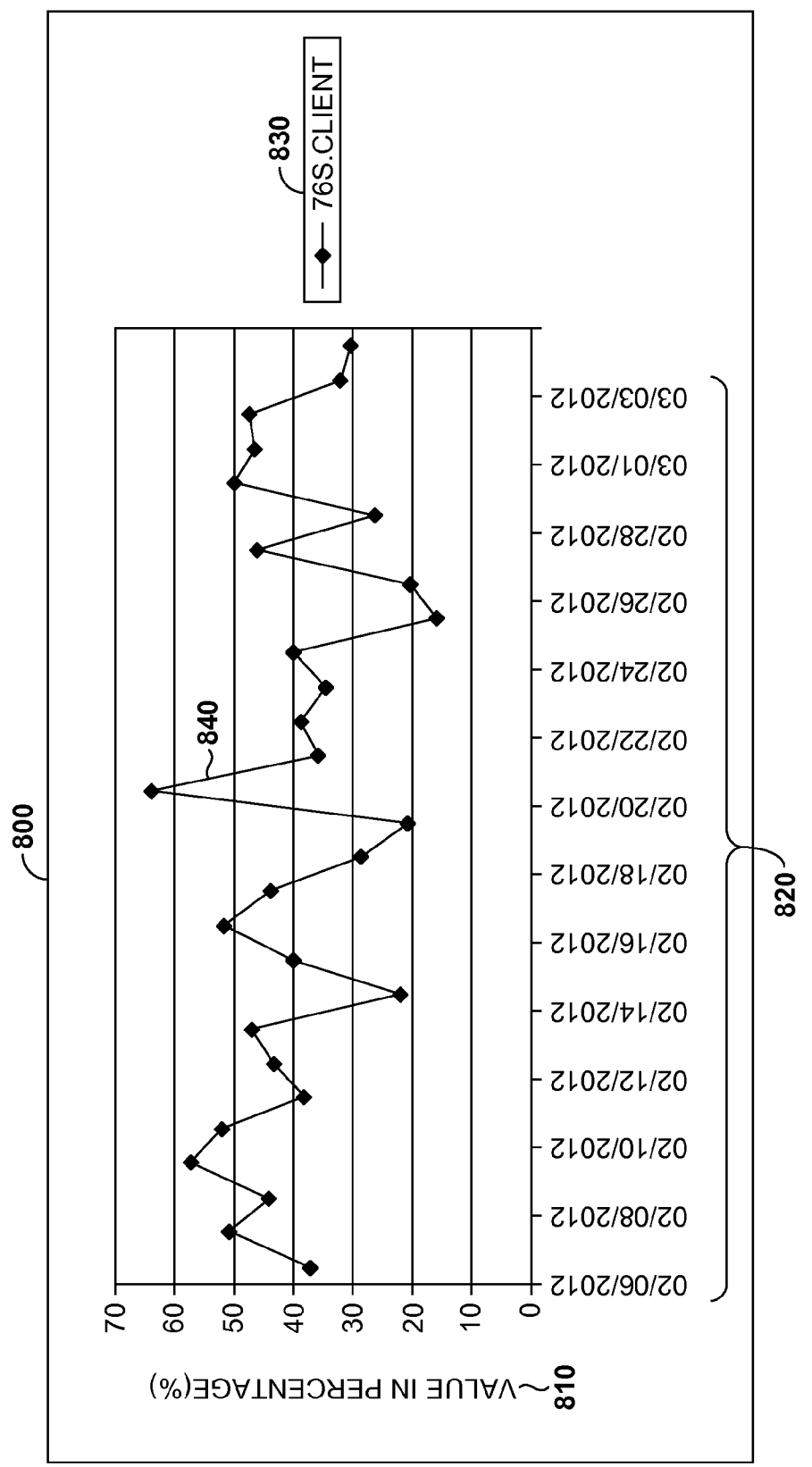
FIG. 8 is a comparison showing channel usage versus channel allocation for a queue manager over time according to an embodiment of the present invention.

At step 530, a comparison is output for display. The comparison may take the form of a graph, as depicted in FIG. 8. The graph may include just a single comparison for a particular queue manager as in FIG. 8, or may included multiple channels, as in FIG. 9. The comparison may show active channels as a percentage of channels allocated to the queue manager.

Figure 6:
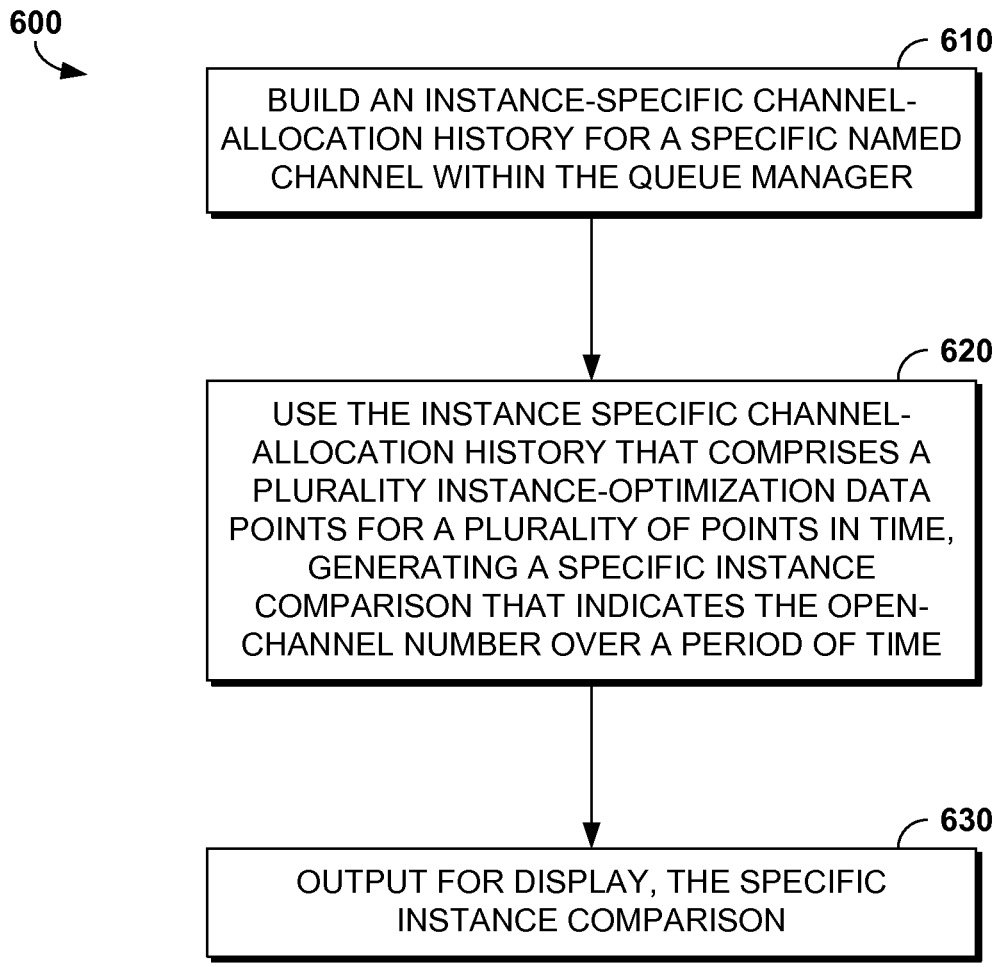
FIG. 6 is a flow diagram in which a method of optimizing an allocation of channels to a queue manager is described according to an embodiment of the present invention.

Turning now to FIG. 6, a method 600 of optimizing an allocation of channels to a queue manager is shown, in accordance with an embodiment of the present invention. As described previously, the method may run on one or more devices running queue managers as part of a messaging-middleware operation. The channels monitored are logical channels that are used to communicate messages between queue managers. Each queue manager may be responsible for hundreds or even thousands of individual queues to which messages may be sent and received. In some embodiments, multiple instances of the same channel may be simultaneously set up. A queue manager may be limited in the total number of channels it is able to run. In addition, a specific instance of a channel may limit the number of identical specific instances that may be active simultaneously.

At step 610, an instance-specific channel-allocation history for a specific named channel within the queue manager is built. The channel-allocation history is built by retrieving channel data for the queue manager at a particular point in time. This process may be repeated at various intervals to generate the history. At each point in time, a running-channel number is generated that indicates how many instances of the specific named channel are running. In one embodiment, this number is determined by retrieving the names of all running channels and sorting them alphabetically. The active channels having the specific name may be counted to determine how many instances of the specific named channel are running. An instance-optimization data point, which comprises at least the running channel number, for the point in time is generated. Thus, the specific channel-allocation history comprises a plurality of instance-optimization data points each for a plurality of different points of time. The history may also comprise allocation settings at the point in time.

At step 620, a specific instance comparison is generated using the instance specific channel-allocation history. The instance comparison shows the running-channel number over a period of time. The specific instance comparison may indicate the running-channel number over a period of time using a line graph such as the one depicted in FIG. 8 or FIG. 9. In one embodiment, the running-channel number is indicated as a percentage of a maximum-instance number, which is the specific channel instances that are allowed to run at the point in time. Thus, the specific instance comparison may be depicted as the running-channel number as a percentage of the maximum-instance number. Both the maximum-instance number and the running-channel number may change at different points in time. In one embodiment, the maximum-instance number of the specific channel instance is taken from the current setting rather than the setting at the time the running-channel number is recorded. Using the current maximum-instant number that allows for a comparison or an evaluation of whether the current number is optimal. For example, the maximum-instance number may increase during a heavy usage period and not be set back to a lower value causing it to be non-optimized.

Figure 7:
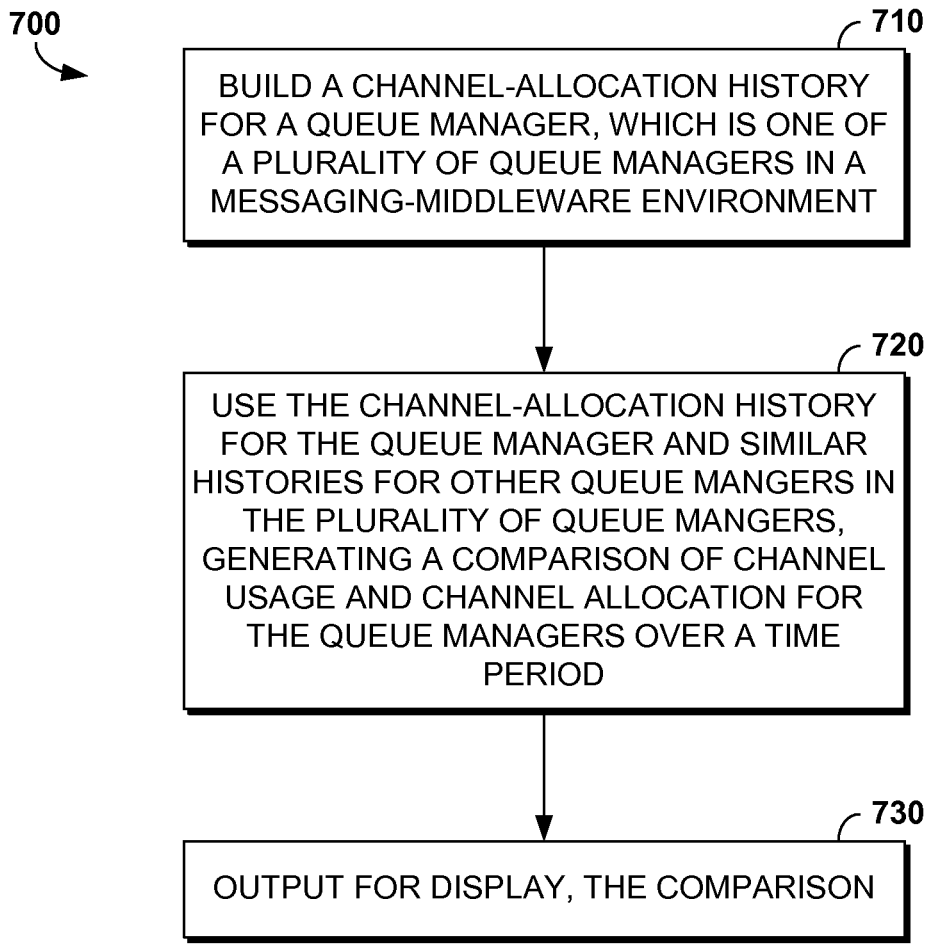
FIG. 7 is a flow diagram in which a method of optimizing an allocation of channels to a queue manager is described according to an embodiment of the present invention.

Turning now to FIG. 7, a method 700 of optimizing an allocation of channels to a queue manager is shown, in accordance with an embodiment of the present invention. At step 710, a channel-allocation history is built for a queue manager. The queue manager is one of a plurality of queue managers in a messaging-middleware environment. The channel-allocation history is built by retrieving, at a point in time, channel data for the queue manager. The channel data is mined to determine a usage number that indicates how many different channels are running on the queue manager at the point in time. An optimization data point for the point in time, which is based on the usage number, is generated and recorded. In addition, the optimization data point may also include the maximum number of channels that are allocated to the queue manager at the point in time. At step 720, a comparison of channel usage and channel allocation to the queue managers over time is generated. The comparison is generated using the channel-allocation history. At step 730, the comparison is output for display.

Figure 9:
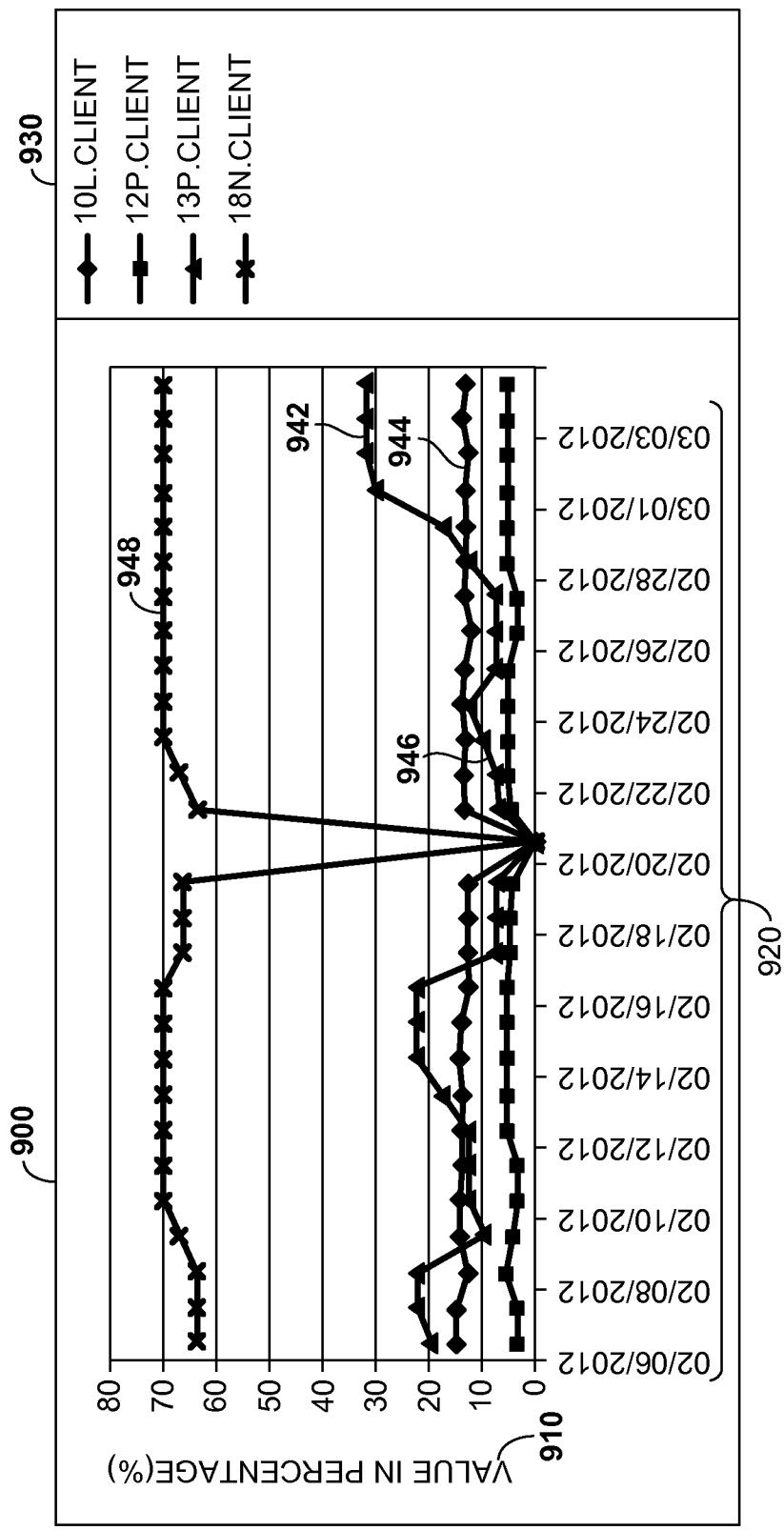
FIG. 9 is a comparison showing channel usage versus channel allocation for a multiple queue managers over time according to an embodiment of the present invention.

FIGS. 8 and 9 show exemplary comparisons that are generated using the allocation history. Both figures show allocation within a queue manager. Similar comparisons may be generated for individual channel instances. Turning now to FIG. 8, a comparison 800 of channel usage versus channel allocation for a queue manager is shown, in accordance with an embodiment of the present invention. The comparison 800 is a line graph showing changes in the percentage of channel usage versus channel allocation for queue manager 72S.client. Graphs may depict multiple comparisons. Usage in each queue manager may be depicted with a separate line having different colors and symbols. Line 830 is for the 76S.client queue manager. Along the X-axis 820, points in time associated with channel usage data are depicted. The Y-axis 810 shows active channels as a percentage of channel allocation at the points in time.

The comparison 800 may be generated in response to a request for the comparison for a particular queue manager or a particular named channel instance. In another embodiment, the comparison 800 is generated because the usage history for the queue manager indicates that optimization may be desirable. An automated analysis may evaluate usage vs. allocation and generate a comparison when percentage usage falls outside of threshold range for optimized allocation. For example, comparison 800 shows the percentage usage did not reach above 70%. This may indicate that the allocation of channels to the 76S.client could be optimized. In this case, less channels might be allocated to the 76S.client.

Turning now to FIG. 9, a comparison 900 showing multiple usages for multiple queue managers is shown, in accordance with an embodiment of the present invention. As can be seen, the comparison 900 is for four different queue managers. Channel usage in each queue manager is depicted by a different line associated with different symbols (i.e., x, triangle, diamond, square). Though not shown, each line could have a different color.

The comparison 900 is a line graph showing the use of allocated channels at particular points in time as a percentage of channels allocated to the queue manager. A key 930 is provided to show which line corresponds to which queue. The line 948 corresponds with the queue manager 18N.client. Line 946 corresponds with queue manager 13P.client. Line 942 corresponds with queue manager 10L.client and the line 944 corresponds with queue manager 12P.client. As with FIG. 8, each data point corresponds with a point in time along the X-axis 920. The percentage usage 910 is depicted on the Y-axis.

The comparison 900 may be generated based on a request for a comparison of specific queue managers. In another embodiment, an analysis is first performed to include queue managers that fall above or below a threshold usage. For example, three of the queue managers have a regular usage of less than 30%. This may indicate that these queue managers have an excess of channels allocated to them. Conversely, the 18N.client queue manager, shown in line 948, may have too few channels allocated to it, as its usage is consistently around 70%. In one embodiment, various filters may be set up to depict channel instances or channel usage within a queue that falls within various thresholds. For example, the chart may depict only queues with usage allocation above or below a particular threshold percentage.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. One or more computer-readable media having computer-executable instructions embodied thereon for performing a method of optimizing an allocation of channels to a queue manager, the method comprising:
 building a channel-allocation history for a queue manager in a messaging-middleware environment by:
 (1) retrieving, at a point in time, channel data for the queue manager,
 (2) determining a usage number that indicates how many different channels are running at the point in time,
 (3) determining a maximum number of channels allocated to the queue manager at the point in time, and (4) generating an optimization data point for the point in time that comprises the usage number divided by the maximum number of channels;

using the channel-allocation history, which comprises a plurality optimization data points for a plurality of points in time, generating a comparison of channel usage and channel allocation for the queue manager over a time period; and outputting for display, the comparison.

2. The media of claim 1, wherein determining the maximum number of channels allocated to the queue manager at the point in time is done by querying a configuration file for the queue manager.

3. The media of claim 1, wherein the comparison is a plot of the plurality of optimization data points.

4. The media of claim 1, wherein the method further comprises:

building an instance-specific channel-allocation history for a specific named channel within the queue manager by:
(1) at a point in time, retrieving channel data for the queue manager,
(2) determining a running-channel number indicating how many instances of the specific named channel are running,
(3) determining a maximum-instance number of the specific channel instance that are allowed to run at the point in time, and
(4) generating an instance-optimization data point for the point in time that comprises the running-channel number divided by the maximum-instance number;

using the instance specific channel-allocation history that comprises a plurality instance-optimization data points for a plurality of points in time, generating a specific instance comparison of the running-channel number and the maximum-instance number for a time period; and outputting for display, the specific instance comparison.

5. The media of claim 4, wherein the method further comprises retrieving the maximum-instance number from an attribute in a definition of the specific named channel.

6. The media of claim 4, wherein the specific instance comparison shows a plot of the plurality instance-optimization data points for the time period.

7. The media of claim 1, wherein the method further comprises analyzing comparisons generated for a plurality of queue managers and triggering an alarm when below a threshold percentage of channels allocated to a queue manager are used over the time period.

8. One or more computer-readable media having computer-executable instructions embodied thereon for performing a method of optimizing an allocation of channels to a queue manager, the method comprising:

building an instance-specific channel-allocation history for a specific named channel within the queue manager by:
(1) at a point in time, retrieving channel data for the queue manager,
(2) determining a running-channel number indicating how many instances of the specific named channel are running, and
(3) generating an instance-optimization data point for the point in time that comprises at least the running-channel number at the point in time;

using the instance specific channel-allocation history that comprises a plurality instance-optimization data points for a plurality of points in time, generating a specific instance comparison that indicates the running-channel number over a period of time; and outputting for display, the specific instance comparison.

9. The media of claim 8, wherein building the instance-specific channel-allocation history also comprises determining a maximum-instance number of the specific channel instance that are allowed to run at the point in time.

10. The media of claim 8, wherein the specific instance comparison is a plot of a plurality of running-channel numbers determined during the time period as a percentage of instances currently allocated to the specific channel instance.

11. The media of claim 8, wherein the method further comprises:

building a channel-allocation history for a queue manager in a messaging-middleware environment by:
(1) retrieving, at a point in time, channel data for the queue manager,
(2) determining a usage number that indicates how many different channels are running at the point in time,
(3) generating an optimization data point for the point in time that comprises the usage number;

using the channel-allocation history, which comprises a plurality optimization data points for a plurality of points in time, generating a comparison of channel usage and channel allocation for the queue manager over a time period; and outputting for display, the comparison of channel usage.

12. The media of claim 11, wherein the method further comprises generating comparisons for a plurality of queue managers and displaying the comparison on a single plot.

13. The media of claim 11, wherein the method further comprises generating a multi-manager comparison that shows percentage usage of channel usage over time versus the channel allocation for a plurality of queues, and wherein only queue managers having a percentage usage outside of a normal threshold range are included in the multi-manager comparison.

14. The media of claim 8, wherein the method further comprises analyzing comparisons generated for a plurality of queue managers and triggering an alarm when below a threshold percentage of channels allocated to a queue manager are used over the period of time.

15. A method of optimizing an allocation of channels to a queue manager, the method comprising:

building a channel-allocation history for a queue manager, which is one of a plurality of queue managers in a messaging-middleware environment, by:
(1) retrieving, at a point in time, channel data for the queue manager,
(2) determining a usage number that indicates how many different channels are running on the queue manager at the point in time, and
(3) generating an optimization data point for the point in time that is based on the usage number;

using the channel-allocation history for the queue manager and similar histories for other queue managers in the plurality of queue managers, generating a comparison of channel usage and channel allocation for the queue managers over a time period; and outputting for display, the comparison.

16. The method of claim 15, wherein determining a maximum number of channels allocated to the queue manager at the point in time is done by querying a configuration file for the queue manager.

17. The method of claim 15, wherein the comparison is a plot of optimization points showing a percentage of the channel allocation used by each of the queue managers.

18. The method of claim 15, wherein the method further comprises:
- building an instance-specific channel-allocation history for a specific named channel within the queue manager by:
  - (1) at a point in time, retrieving channel data for a queue manager,
  - (2) determining a running-channel number indicating how many instances of the specific named channel are running,
  - (3) determining a maximum-instance number of the specific channel instance that are allowed to run at the point in time, and
  - (4) generating an instance-optimization data point for the point in time that comprises the running-channel number divided by the maximum-instance number;
- using the instance specific channel-allocation history that comprises a plurality instance-optimization data points for a plurality of points in time, generating a specific instance comparison of the running-channel number and the maximum-instance number for a time period; and
- outputting for display, the specific instance comparison.

19. The method of claim 18, wherein the method further comprises retrieving the maximum-instance number from an attribute in a definition of the specific named channel.

20. The method of claim 18, wherein the specific instance comparison shows a plot of the plurality instance-optimization data points for the time period.

* * * * *